United States Patent
Jounay et al.

(10) Patent No.: US 9,294,299 B2
(45) Date of Patent: Mar. 22, 2016

(54) METHOD OF COMMUNICATION BETWEEN TWO ITEMS OF TERMINATION EQUIPMENT

(75) Inventors: Frédéric Jounay, Lausanne (CH); Fabien Le Clech, Issy les Moulineaux (FR)

(73) Assignee: FRANCE TELECOM, Paris (FR)

( * ) Notice: Subject to any disclaimer, the term of this patent is extended or adjusted under 35 U.S.C. 154(b) by 309 days.

(21) Appl. No.: 13/997,470

(22) PCT Filed: Dec. 22, 2011

(86) PCT No.: PCT/FR2011/053169
§ 371 (c)(1),
(2), (4) Date: Sep. 23, 2013

(87) PCT Pub. No.: WO2012/085488
PCT Pub. Date: Jun. 28, 2012

(65) Prior Publication Data
US 2014/0010238 A1  Jan. 9, 2014

(30) Foreign Application Priority Data
Dec. 23, 2010  (FR) .................................... 10 61157

(51) Int. Cl.
*H04L 12/28* (2006.01)
*H04L 12/717* (2013.01)
*H04L 12/46* (2006.01)
*H04L 12/721* (2013.01)

(52) U.S. Cl.
CPC ........ *H04L 12/2859* (2013.01); *H04L 12/4633* (2013.01); *H04L 45/42* (2013.01); *H04L 45/68* (2013.01)

(58) Field of Classification Search
None
See application file for complete search history.

(56) References Cited

U.S. PATENT DOCUMENTS

| 8,737,200 | B1* | 5/2014 | Ould-Brahim | 370/225 |
| 2005/0190757 | A1* | 9/2005 | Sajassi | 370/389 |
| 2008/0253381 | A1* | 10/2008 | Ward et al. | 370/396 |
| 2011/0176411 | A1* | 7/2011 | Niger et al. | 370/218 |

OTHER PUBLICATIONS

L. Martini et al., "Encapsulation Methods for Transport of Ethernet over MPLS Networks" RFC4448, Apr. 2006.

(Continued)

*Primary Examiner* — Kodzovi Acolatse
(74) *Attorney, Agent, or Firm* — David D. Brush; Westman, Champlin & Koehler, P.A.

(57) ABSTRACT

A method for communicating between first termination equipment and at least one second and one third termination equipment through respective first and second pseudo links in a packet-switching network. The method includes the following steps performed by the first termination equipment: intercepting a data frame sent by first customer equipment, connected to the second termination equipment, to second customer equipment, the data frame including identifiers of the first customer equipment and the second customer equipment; determining a parameter for identifying the second termination equipment, based on the identifier of the first customer equipment; and determining a parameter for identifying the third termination equipment, based on the identifier of the second customer equipment; and transmitting, to the second termination equipment, of a request to establish a third pseudo-link between the second termination equipment and the third termination equipment through which the data sent by the first customer equipment are transmitted.

12 Claims, 3 Drawing Sheets

(56) References Cited

OTHER PUBLICATIONS

E, Rosen et al., "Multiprotocol Label Switching Architecture" RFC3031, Jan. 2001.
S. Bryant et al., "Pseudo Wire Emulation Edge-to-Edge (PWE3) Architecture" RFC3985, Mar. 2005.
International Preliminary Report on Patentability and English translation of Written Opinion dated Jun. 25, 2013 for corresponding International Application No. PCT/FR2011/053169, filed Dec. 22, 2011.
International Search Report and Written Opinion dated May 4, 2012 for corresponding International Application No. PCT/FR2011/053169, filed Dec. 22, 2011.
Uze, J.M., "VPLS: Virtual Private LAN Service", JRES 2003 5EMES Journees Reseau, Oct. 2003, pp. 1-11, XP002651334, France, voir section 4.
Black, U.D., "ATM vol. III. Internetworking with ATM", 1998, Prentice Hall PTR, USA, XP002651335, ISBN: 0-13-784182-5, pp. 108-132, p. 112, line 27 to p. 16, line 2, figures 7-3, 7-4, 7-5.
Bryant S. et al., "Pseudo Wire Emulation Edge-to-Edge (PWE3) Architecture; rfc3985.txt", IETF, CH, Mar. 1, 2005, XP015009756.
Witters J. et al., "VPLS Technical Tutorial: Technical Introduction to Multipoint Ethernet Services Over MPLS", Alcatel Telecommunications Review, Compagnie Financiere Alcatel, 54 rue de la Boetie 75008 Paris, Oct. 1, 2004, XP007010179.
French Search Report and Written Opinion dated Jul. 19, 2011 for corresponding French Application No. 1061157, filed Dec. 23, 2010.

* cited by examiner

METHOD OF COMMUNICATION BETWEEN TWO ITEMS OF TERMINATION EQUIPMENT

CROSS-REFERENCE TO RELATED APPLICATIONS

This application is a Section 371 National Stage Application of International Application No. PCT/FR2011/053169, filed Dec. 22, 2011, which is incorporated by reference in its entirety and published as WO 2012/085488 on Jun. 28, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The invention lies in the field of telecommunications, and more particularly mobile access networks.

BACKGROUND OF THE DISCLOSURE

The VPLS service or Virtual Private LAN Service in English terminology is a service allowing the interconnection between a plurality of IP (Internet Protocol) communication networks, such as for example private networks or enterprise networks. The VPLS service makes it possible to connect together a plurality of IP networks corresponding for example to sites of one and the same enterprise that are distant from one another so as to form a multipoint-to-multipoint architecture.

An example of data-transmission technology used when the VPLS service is applied is the MPLS (MultiProtocol Label Switching) technology. The MPLS technology proposes adding as a data packet header one or more labels containing information allowing the items of network equipment to determine the next hop that a packet must make to reach its destination.

The MPLS technology is described in greater detail in a document of the Internet Engineering Task Force (the internet standardization group, abbreviated in English as the IETF), referenced RFC 3031 (RFC standing for Request For Comments in English).

When the VPLS service is applied, items of equipment belonging to various LAN networks are connected together by means of MPLS paths called LSPs (Label Switched Path).

An LSP path is established from an item of head terminal equipment (or Ingress equipment) via intermediate items of equipment and to an item of destination terminal equipment (or Egress equipment).

However, the MPLS technology makes it possible to process only packets that conform to the IP protocol.

In order to alleviate this drawback, the PWE3 (PseudoWire Emulation Edge to Edge) standardization group of the IETF defines a virtual circuit concept making it possible to emulate a two-way link between two items of equipment of two distinct LAN networks based on the IP/MPLS technology. Such pseudo-wires, defined in document RFC 3985, allow the transmission of data packets that do not conform to the IP protocol, such as for example data frames conforming to the Ethernet protocol as defined in the IETF document referenced RFC 4448.

Therefore, the VPLS service consists of the establishment of pseudo-wires conforming to the Ethernet protocol between items of communication equipment belonging to various networks. Such pseudo-wires are established on the data-link layer as defined in the OSI (Open Systems Interconnection) model defined by the ISO (International Standards Organization). The pseudo-wires thus established are for example pseudo-wires conforming to the Ethernet protocol. Such Ethernet pseudo-wires are supported by an underlying path such as links, for example tunnels conforming to the LSP (Label Switched Path) protocol defined in IETF document RFC 3031.

When the VPLS service is applied, each item of terminal equipment belonging to an IP network is connected to a plurality of other items of terminal equipment belonging to other IP networks by means of Ethernet pseudo-wires thus creating a connection between the various items of terminal equipment. However, such an architecture is fixed during the establishment of the various Ethernet pseudo-wires and does not change during the use of the VPLS service.

Therefore, when new pseudo-wires are required in order to connect other items of communication equipment together, the architecture underlying the use of the VPLS service is not adapted.

SUMMARY

An embodiment of the invention proposes a method of communication between a first item of termination equipment (PE2) and at least one second and one third item of termination equipment (PE1, PE3) belonging to a packet-switching network, a first pseudo-wire (pw1) being established between the first and the second items of termination equipment, and a second pseudo-wire (pw2) being established between the first and the third items of termination equipment, the method comprising the following steps carried out by the first item of termination equipment:

interception of a data frame sent by a first item of customer equipment, connected to the second item of termination equipment, to a second item of customer equipment, the data frame comprising an identifier of the first item of customer equipment and an identifier of the second item of customer equipment, determination of a parameter for identifying the second item of termination equipment, based on the identifier of the first item of customer equipment, determination of a parameter for identifying the third item of termination equipment to which the second item of customer equipment is connected, based on the identifier of the second item of customer equipment, transmission, to the second item of termination equipment, of a request to establish a third pseudo-wire between the second item of termination equipment and the third item of termination equipment through which the data sent by the first item of customer equipment are intended to be transmitted.

Such a solution makes it possible to adapt the data transfer plan to the needs of the items of customer equipment, such as for example LTE (Long Term Evolution) or 4G base stations during data interchanges between adjacent items of customer equipment, such as signaling messages between base stations or user data, during the application of procedures for changing base stations or handovers.

A pseudo-wire is established as required in order to transmit data between the second and the third item of termination equipment. The data are then transmitted directly between the items of termination equipment to which the items of customer equipment are connected.

The solution that is the subject of the invention makes it possible to economize on network resources because only pseudo-wires designed to transmit a data stream between two items of termination equipment are established, thus avoiding an unnecessary reservation of network resources, unlike the architecture model known as the full-mesh architecture in English. In such an architecture model, pseudo-wires are established between all the items of termination equipment so that data streams can be interchanged between all the base stations, then consuming network resources without this being necessary.

The solution that is the subject of the invention therefore provides flexibility in the establishment of the pseudo-wires since this is done as required; such a solution therefore is of value during the operation of the network.

Moreover, the solution that is the subject of the invention makes it possible to reduce the data transmission time between the two items of customer equipment, unlike the architectures known as Hub and Spoke architectures, in which the data transmitted by an item of customer equipment are forced to pass through the master or hub item of equipment. In such an architecture model, each item of customer equipment is connected to the master item of termination equipment through a pseudo-wire established between the master item of termination equipment and an item of termination equipment to which the item of customer equipment is connected.

According to a particular feature of the communication method that is the subject of the invention, the request to establish the third pseudo-wire comprises a parameter representative of the maximum allowed idle time for the third pseudo-wire.

An idle time for a pseudo-wire is a period of time during which no data is transmitted over the pseudo-wire. The maximum idle time allowed for a pseudo-wire is the period of time beyond which, if no datum is transmitted over the pseudo-wire, the latter is deleted, thus freeing up resources.

According to a particular feature of the communication method that is the subject of the invention, the request to establish the pseudo-wire comprises a parameter for identifying the second item of termination equipment, the parameter for identifying the third item of termination equipment, a parameter indicating that it involves a request to establish the third pseudo-wire and a parameter for identifying a virtual network to which the first and the second items of customer equipment belong.

The decision to establish a pseudo-wire being taken by the first item of termination equipment that does not form an end of the pseudo-wire to be established, the item of termination equipment intended to establish the pseudo-wire therefore receives the information necessary to establish the pseudo-wire.

According to a particular feature of the communication method that is the subject of the invention, the request to establish the third pseudo-wire also comprises a parameter for identifying the first item of customer equipment and a parameter for identifying the second item of customer equipment.

These items of information make it possible to identify in a unique manner the various items of customer equipment that are connected to one and the same item of termination equipment. Specifically, in the absence of such parameters, that is to say when the identifier of the item of customer equipment that is intended to be the recipient is unknown in the MAC table of the second item of termination equipment, the second item of termination equipment transmits, according to document RFC 4762, the data frames transmitted by the first item of customer equipment to the second item of customer equipment over all of the pseudo-wires of which the first item of termination equipment forms an end. This prevents such a transmission to items of customer equipment that are not involved.

According to a particular feature of the communication method that is the subject of the invention, the method comprises a step of receiving a message confirming the establishment of the third pseudo-wire sent by the second item of termination equipment.

On receipt of this information, the first item of termination equipment terminates the transmission of the data intended for the second item of customer equipment via the second pseudo-wire.

According to a particular feature of the communication method that is the subject of the invention, the method comprises a step of transmitting, to the second item of termination equipment, a request to delete the third pseudo-wire.

In order to economize the transmission resources, the first item of termination equipment commands the destruction of the third pseudo-wire once the data transmission is terminated.

The invention also relates to a method for establishing a pseudo-wire intended to transmit data between a first item of customer equipment and a second item of customer equipment, a first pseudo-wire being established between a first item of termination equipment (PE2) and a second item of termination equipment (PE1) to which the first item of customer equipment is connected, a second pseudo-wire being established between the first item of termination equipment (PE2) and a third item of termination equipment (PE3) to which the second item of customer equipment is connected, the method comprising the following steps carried out by the second item of termination equipment:

reception of a request to establish a pseudo-wire between the second item of termination equipment and the third item of termination equipment, the transmission request comprising a parameter for identifying the second item of termination equipment, the parameter for identifying the third item of termination equipment, a parameter indicating that it involves a request to establish the third pseudo-wire and a parameter for identifying a virtual network to which the first and the second items of customer equipment belong, the establishment request being transmitted by the first item of termination equipment, transmission, to the third item of termination equipment, of a message to establish the pseudo-wire.

According to a particular feature of the method for establishing a pseudo-wire that is the subject of the invention, the method comprises a step of transmitting, to the first item of termination equipment, a message confirming the establishment of the pseudo-wire transmitted by the second item of termination equipment.

According to a particular feature of the method for establishing a pseudo-wire that is the subject of the invention, the method comprises a step of transmitting, to the first item of termination equipment, a message confirming the deletion of the pseudo-wire transmitted by the second item of termination equipment.

A further subject of the invention is an item of termination equipment (PE2) capable of communicating with at least one second and one third item of termination equipment (PE1, PE3) belonging to a packet-switching network, a first pseudo-wire (pw1) being established between said item of termination equipment and the second item of termination equipment, and a second pseudo-wire (pw2) being established between said item of termination equipment and the third item of termination equipment, the item of termination equipment comprising:

means for intercepting a data frame sent by a first item of customer equipment, connected to the second item of termination equipment, to a second item of customer equipment, the data frame comprising an identifier of the first item of customer equipment and an identifier of the second item of customer equipment, means for determining a parameter for identifying the second item of termination equipment to which the first item of customer equipment is connected, based on the identifier of the first item of customer equipment, means for determining a parameter for identifying the third item of termination equipment to which the second item of customer equipment is connected, based on the identifier of the second item of customer equipment, means for transmitting, to the second item of termination equipment, a request to establish a third pseudo-wire between the second item of termination equipment and the third item of termination equipment through which the data sent by the first item of customer equipment are intended to be transmitted.

The invention also relates to an item of termination equipment intended to form one end of a first pseudo-wire intended to transmit data between a first item of customer equipment and a second item of customer equipment, the first item of customer equipment being connected to the item of termination equipment, a second pseudo-wire being established between a first item of termination equipment (PE2) and a second item of termination equipment (PE3) to which the second item of customer equipment is connected, the first item of termination equipment forming a second end of the first pseudo-wire, the item of termination equipment comprising:

means for receiving a request to establish a pseudo-wire between the item of termination equipment and the second item of termination equipment, the transmission request comprising a parameter for identifying the item of termination equipment, the parameter for identifying the second item of termination equipment, a parameter indicating that it involves a request to establish the third pseudo-wire and a parameter for identifying a virtual network to which the first and the second items of customer equipment belong, the establishment request being transmitted by the first item of termination equipment, transmission, to the third item of termination equipment, of a message to establish the pseudo-wire.

According to other aspects, the invention also relates to computer programs comprising program-code instructions for carrying out the steps of the method of communication and the method for establishing a pseudo-wire that are described above, when these programs are executed by a computer.

Each of the computer programs described above can use any programming language and be in the form of source code, object code or intermediate code between source code and object code, such as in a partially compiled form, or in any other desirable form.

A further subject of the invention is a recording medium that can be read by a computer on which a computer program as described above is recorded.

The information medium may be any entity or device capable of storing the program. For example, the medium may comprise a storage means, such as a ROM (for "Read Only Memory"), for example a CD ROM or a ROM of a microcircuit, or else a magnetic recording means, for example a floppy disk or a hard disk.

Furthermore, the information medium may be a transmissible medium such as an electrical or optical signal, which can be routed via an electrical or optical cable, by radio or by other means. The program according to the invention may in particular be downloaded on a network of the Internet type.

Alternatively, the information medium may be an integrated circuit in which the program is incorporated, the circuit being suitable for executing or for being used in the execution of the method in question.

BRIEF DESCRIPTION OF THE DRAWINGS

Other features and advantages will become evident on reading embodiments described with reference to the drawings in which.

DETAILED DESCRIPTION OF ILLUSTRATIVE EMBODIMENTS

Figure 1:
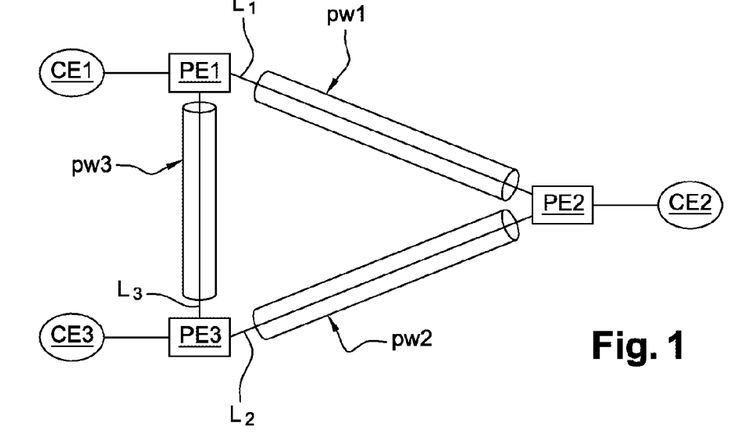
FIG. 1 represents an access network according to the hub-and-spoke architecture in which the invention is used.

FIG. 1 represents a radio access network R in which the communication and establishment methods that are the subject of the invention are applied.

Such a mobile access network R comprises a plurality of items of termination equipment $PE_i$, i∈{1, 3} connected together by means of wire links such as copper pairs, or a section of optical fiber. Such items of termination equipment $PE_i$ are for example routers.

Therefore, a first item of termination equipment $PE_1$ is connected via a first link L1 to a second item of termination equipment $PE_2$. The item of termination equipment $PE_2$ is connected to a third item of termination equipment $PE_3$ by means of a link L2. Finally, the item of termination equipment $PE_3$ is connected, via a link L3, to the first item of termination equipment $PE_1$.

Such a network is a network of hub-and-spoke type. "Hub-and-spoke" or "star-shaped" designates a network architecture in which an item of equipment is provided to which all the other items of network equipment are connected. Such an item of equipment is called a master item of equipment. The other items of equipment of the network are called slave items of equipment. The master item of equipment forms a central connection point through which all the data streams, relating to the various communications established between the various network items of equipment connected to the item of equipment, are flowing. In the network R, the item of termination equipment PE2 is the master item of equipment. The items of termination equipment PE2 and PE3 are slave items of equipment.

A first item of customer equipment CE1, such as for example a base station, is connected to the first item of termination equipment $PE_1$.

Un second item of customer equipment CE2, such as a serving gateway S-GW or a mobility management entity (MME) is connected to the second item of termination equipment PE2.

A third item of customer equipment CE3 is connected to the third item of termination equipment $PE_3$. Such an item of customer equipment CE3 is for example a base station.

In the rest of the description, the invention is described for a plurality of IP networks connected together by means of the VPLS service within one and the same VPLS domain. All of these networks forming the VPLS domain (as described in document RFC 4762) correspond for example to sites of one and the same enterprise that are distant from one another so as to form a multipoint-to-multipoint architecture.

Figure 2:
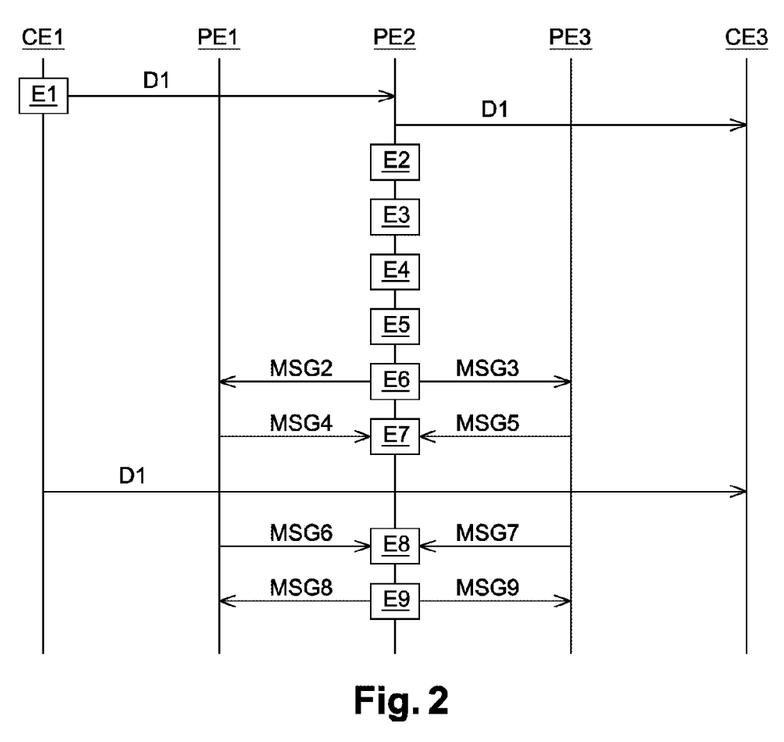
FIG. 2 represents the various steps of the communication method applied by the second item of termination equipment or master item of equipment.

With reference to FIG. 2, the first item of customer equipment CE1 transmits data frames D1 to the third item of customer equipment CE3 during a step E1. The data frames D1 are transmitted via a pseudo-wire pw1 previously established between the first item of termination equipment PE1 and the second item of termination equipment PE2 and then via a pseudo-wire pw2 previously established between the second item of termination equipment PE2 and the third item of termination equipment PE3. The first pseudo-wire pw1 is supported by an underlying path formed by the link L1. The second pseudo-wire pw2 is supported by an underlying path formed by the link L2.

Figure 3A:
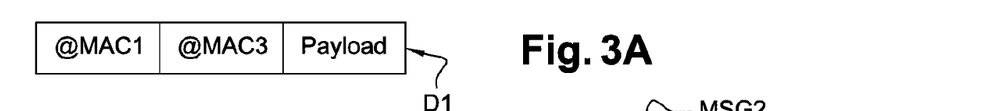
FIGS. 3A to 3D represent the various messages interchanged between the master item of termination equipment and the slave items of termination equipment during the implementation of the communication method and the method for establishing a pseudo-wire.

Such a data frame D1, represented in FIG. 3A, comprises an identifier of the first item of customer equipment CE1 such as its MAC address @MAC1, and an identifier of the third item of customer equipment CE3, such as its MAC address @MAC3, and the payload data Payload. A MAC address is an address used to identify an item of communication equipment in the data link layer as defined in the OSI (Open Systems Interconnection) model defined by the ISO (International Standards Organization).

During a step E2, the second item of termination equipment PE2 intercepts a data frame D1. During a step E3, the second item of termination equipment PE2 determines the identifier @MAC3 of the item of customer equipment CE3 that is to receive the data frames D1, and the identifier @MAC1 of the item of customer equipment CE1 sending the data frames D1.

During a step E4, the second item of termination equipment PE2 then interrogates a MAC (for Medium Access Control) address table $T_{MAC2}$ or a VSI (Virtual Switching Instance) table comprising the MAC addresses @MAC of the items of customer equipment CE for which the second item of termination equipment PE2 has already intercepted data frames.

Such a MAC address table $T_{MAC2}$ is completed during the transmission of data frames between various items of customer equipment CE via the pseudo-wires pw1 and pw2 as defined in document RFC 4762. Specifically, since the second item of termination equipment is a master item of termination equipment, all the data frames transmitted between the various items of customer equipment of one and the same VPLS domain are transmitted via the master item of termination equipment PE2. Therefore, during the first communication of data frames between the item of customer equipment CE1 and another item of customer equipment such as the item of customer equipment CE2, via the first pseudo-wire pw1, the MAC address table $T_{MAC2}$ of the second item of termination equipment receives the addition of an identifier pw1 of the first pseudo-wire pw1 via which the second item of termination equipment knows that it can transmit data frames to the item of customer equipment CE1. Specifically, a pseudo-wire can be considered to be a logical interface between two MAC tables of two items of termination equipment. In this instance, it is emphasized that the identifier of the VPLS domain maybe reused as an FEC, the identifier of pw3 as defined in document RFC 4762.

Knowing the identifier pw1 of the pseudo-wire pw1, the second item of termination equipment PE2 determines, during a step E5, an identifier of the first item of termination equipment PE1 to which the item of customer equipment CE1 is connected, such as its IP address @IP1. Such an IP address @IP1 of the first item of termination equipment PE1 is for example stored in a routing table of the second item of termination equipment PE2.

The same applies during the first communication of data frames between the third item of customer equipment CE3 and the second item of customer equipment CE2 via the second pseudo-wire pw2, the MAC address table $T_{MAC2}$ of the second item of termination equipment receives the addition of an identifier pw2 of the second pseudo-wire pw2 through which the second item of termination equipment knows that it can transmit data frames to the item of customer equipment CE2.

Similarly, during the first communication of data frames between the item of customer equipment CE1 and the item of customer equipment CE2, the MAC address table $T_{MAC1}$ of the first item of termination equipment PE1 also receives the addition of an identifier @MAC2 of the second item of customer equipment CE2 and the identifier pw1 of the pseudo-wire pw1.

During the first communication of data frames between the item of customer equipment CE3 and the item of customer equipment CE2, the MAC address table $T_{MAC3}$ of the third item of termination equipment PE3 also receives the addition of an identifier @MAC2 of the second item of customer equipment CE2 and the identifier pw2 of the pseudo-wire pw2.

During a step E6, the second item of equipment PE2 transmits to the first item of equipment PE1 an establishment request MSG2 to establish a third pseudo-wire pw3 between the first item of termination equipment PE1 and the third item of termination equipment PE3 through which the data frames D1 transmitted by the first item of customer equipment CE1 to the third item of customer equipment CE3 are intended to be transmitted. The pseudo-wire pw3 is supported by an underlying path consisting of the link L3. Such a request to establish a pseudo-wire is transmitted in the command plan MPLS as defined in document RFC 4447. It is for example a LDP Notification message.

Figure 3B:
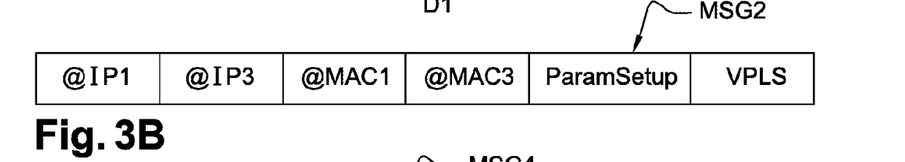

Such a request to establish a pseudo-wire pw3, shown in FIG. 3B, comprises the identifier @IP1 of the first item of termination equipment PE1, the identifier @IP3 of the third item of termination equipment PE3, the MAC address @MAC1 of the first item of customer equipment CE1 and the MAC address @MAC3 of the item of customer equipment CE3, making it possible, as necessary, to complete the MAC table $T_{MAC1}$ of the first item of termination equipment PE1, a parameter ParamSetUp indicating that the request MSG2 is a request to establish a pseudo-wire and finally the VPLS identifier of the VPLS domain to which the items of customer equipment CE1 and CE3 belong. Completing to the MAC table $T_{MAC1}$ during the establishment of the pseudo-wire pw3 prevents the first item of termination equipment PE1 from transmitting the data frames transmitted by the first item of customer equipment CE1 to the third item of customer equipment CE3 over all the pseudo-wires for which the item of termination equipment PE2 forms one end.

Still during step E6, the second item of equipment PE2 transmits to the third item of equipment PE3 an establishment request MSG3 to establish the third pseudo-wire pw3. Such an establishment request MSG3 to establish a pseudo-wire pw3 comprises the identifier @IP1 of the first item of termination equipment PE1, the identifier @IP3 of the third item of termination equipment PE3, the MAC address @MAC1 of the first item of customer equipment CE1 and the MAC address @MAC3 of the third item of customer equipment CE3, making it possible, as necessary, to complete the MAC table $T_{MAC3}$ of the third item of termination equipment PE3, the parameter ParamSetUp indicating that the request MSG3 is a request to establish a pseudo-wire and finally the VPLS identifier of the VPLS domain to which the items of customer equipment CE1 and CE3 belong.

Since the communication between the items of termination equipment PE1 and PE3 are two-way, the termination equipment PE2 transmits a request to establish the pseudo-wire pw3 to the two items of termination equipment PE1 and PE3 forming the two ends of the pseudo-wire pw3.

In a first embodiment, the establishment requests MSG2 and MSG3 to establish the pseudo-wire pw3 comprise an additional parameter ParamATime indicating a maximum idle time allowed for a pseudo-wire. The maximum idle time allowed for a pseudo-wire is the period of time beyond which, if no data frame is transmitted via the pseudo-wire, the latter is deleted thus releasing the resources.

Once this period has elapsed, the pseudo-wire pw3 is deleted thus releasing the resources for another communication.

Figure 3C:
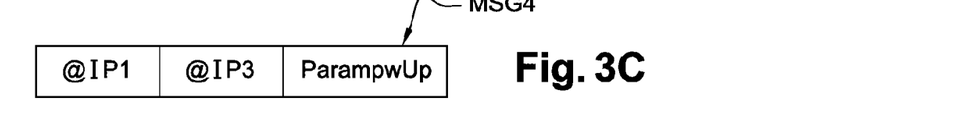

During a step E7, the second item of termination equipment PE2 receives a message MSG4 transmitted by the first item of termination equipment PE1 informing it that the pseudo-wire pw3 is established between the first item of termination equipment PE1 and the third item of termination equipment PE3. The second item of equipment PE2 also receives, during step E7, a message MSG5 informing it that the pseudo-wire pw3 is established between the third item of termination equipment PE3 and the first item of termination equipment PE1. The messages MSG4 and MSG5 are for example messages of the LDP Notification type as defined in the IETF document referenced RFC 5036. Such messages, shown in FIG. 3C, comprise, in addition to the identifiers @IP1 and @IP3 of the items of termination equipment PE1 and PE3, the VPLS identifier of the VPLS domain to which the items of customer equipment CE1 and CE3 belong and a parameter ParampwUp indicating that the pseudo-wire pw3 has been established and the identifiers of the first and the third items of termination equipment PE1 and PE3.

In the first embodiment, once the maximum idle time allowed for the pseudo-wire pw3 indicated by the ParamATime has elapsed, the second item of termination equipment PE2 receives, during a step E8, a notification message MSG6 indicating that the pseudo-wire pw3, established between the first item of termination equipment PE1 and the third item of termination equipment PE3, has been deleted.

Still during step E8, the second item of termination equipment PE2 receives a notification message MSG7 indicating that the pseudo-wire pw3, established between the third item of termination equipment PE3 and the first item of termination equipment PE1, has been deleted.

The messages MSG6 and MSG7 are for example messages of the LDP Notification type comprising a parameter ParampwDown indicating that the pseudo-wire pw3 has been deleted, as well as the identifiers @IP1 and @IP3 of the first and of the third items of termination equipment PE1 and PE3, and the VPLS identifier of the VPLS domain to which the items of customer equipment CE1 and CE3 belong.

Figure 3D:
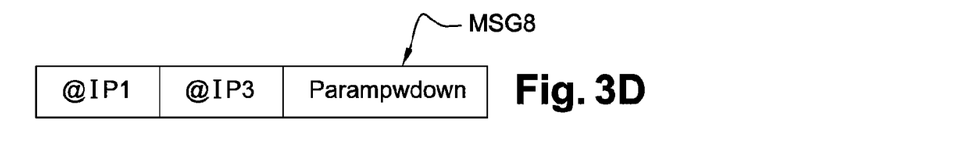

In a second embodiment, the second item of termination equipment PE2 transmits to the first item of termination equipment PE1, during a step E9, a message MSG8 requesting the deletion of the pseudo-wire pw3 established between the first item of termination equipment PE1 and the third item of termination equipment PE3 for a first direction of transmission of the data frames D1. Still during step E9, the second item of termination equipment PE2 transmits to the third item of termination equipment PE3 a message MSG9 requesting the deletion of the pseudo-wire pw3 established between the third item of termination equipment PE3 and the first item of termination equipment PE1 for a second direction of transmission of the data frames D1. The messages MSG8 and MSG9 are for example messages of the LDP Notification type. Such messages, shown in FIG. 3D, comprise, in addition to the identifiers @IP1 and @IP3 of the items of termination equipment PE1 and PE3, the VPLS identifier of the VPLS domain to which the items of customer equipment CE1 and CE3 belong and a parameter ParampwDown indicating that the pseudo-wire pw3 has been deleted as well as the identifiers of the first and third items of termination equipment PE1 and PE3.

Figure 4:
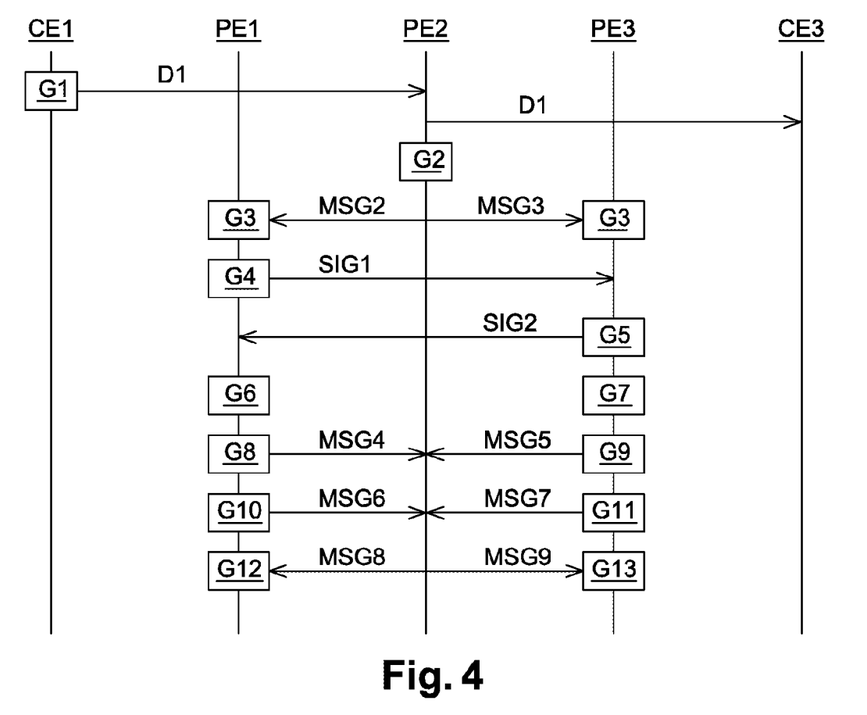
FIG. 4 represents the various steps of the method for establishing a pseudo-wire applied by the slave items of termination equipment.

With reference to FIG. 4, the first item of customer equipment CE1 transmits data frames D1 to the third item of customer equipment CE3 during a step G1. The data frames D1 transmitted by the item of customer equipment CE1 are intercepted by the second item of termination equipment PE2 because the latter is the master item of equipment.

During a step G2, the second item of termination equipment PE2 interrogates the MAC address table $T_{MAC2}$ in order to determine, by means of the MAC address @MAC1 of the item of customer equipment CE1, and the MAC address @MAC3 of the item of customer equipment CE3, amongst all the items of termination equipment PE1, PE3 that are connected thereto, or slave items of termination equipment, the one to which the first item of customer equipment CE1 transmitting the data frames D1 is connected and the one to which the third item of customer equipment CE3 that is the recipient of the data transmitted by the first item of customer equipment CE1 is connected.

Once the items of termination equipment PE1 and PE3 have been identified, the second item of termination equipment PE2 transmits to the first item of termination equipment PE1 and to the third item of termination equipment PE3 a request to establish a pseudo-wire because the communication between the items of termination equipment PE1 and PE3 is two-way.

The first item of termination equipment PE1 receives, during a step G3, an establishment request MSG2 to establish a third pseudo-wire pw3 between the first item of termination equipment PE1 and the third item of termination equipment PE3 through which the data transmitted by the first item of customer equipment CE1 are intended to be transmitted. The pseudo-wire pw3 is supported by an underlying path formed by the link L3.

Such a request to establish a pseudo-wire pw3 comprises the identifier @IP1 of the first item of termination equipment PE1, the identifier @IP3 of the third item of termination equipment PE3, the MAC address @MAC1 of the first item of customer equipment CE1 and the MAC address @MAC3 of the item of customer equipment CE3, making it possible, as necessary, to complete the MAC table $T_{MAC1}$ of the first item of termination equipment PE1, the parameter ParamSetUp indicating that the request MSG2 is a request to establish a pseudo-wire and finally the VPLS identifier of the VPLS domain to which the items of customer equipment CE1 and CE3 belong.

During the step G3, the third item of termination equipment PE3 receives an establishment request MSG3 to establish the third pseudo-wire pw3 transmitted by the second item of termination equipment PE2 via the second pseudo-wire pw2. Such an establishment request MSG3 to establish a pseudo-wire pw3 comprises the identifier @IP1 of the first item of termination equipment PE1, the identifier @IP3 of the third item of termination equipment PE3, the MAC address @MAC1 of the first item of customer equipment CE1 and the MAC address @MAC3 of the item of customer equipment CE3, making it possible, as necessary, to complete the MAC table $T_{MAC3}$ of the third item of termination equipment PE3, the parameter ParamSetUp indicating that the request MSG3 is a request to establish a pseudo-wire and finally the VPLS identifier of the VPLS domain to which the items of customer equipment CE1 and CE3 belong.

In a first embodiment, the establishment requests MSG2 and MSG3 to establish the pseudo-wire pw3 comprise an additional parameter ParamATime indicating a maximum idle time allowed for a pseudo-wire. The maximum idle time allowed for a pseudo-wire is the period of time beyond which, if no data frame is transmitted via the pseudo-wire, the latter is deleted thus releasing resources.

The establishment of the pseudo-wire pw3 is based, for example, on the interchange of establishment requests conforming to the T-LDP (Label Distribution Protocol) protocol defined in the IETF document referenced RFC 4447.

Thus, for a first direction of transmission, a first establishment message SIG1 to establish the pseudo-wire pw3 is transmitted by the first item of termination equipment PE1 to the third item of termination equipment PE3 during a step G4. This first establishment request SIG1 comprises notably the VPLS identifier of the VPLS domain to which the first and the third items of customer equipment CE1, CE3 belong. The establishment request SIG1 also comprises a label lbl1 intended to be associated as a header of the data frames D1 transmitted by the third item of termination equipment PE3 to the first item of termination equipment PE1 via the pseudo-wire pw3.

During a step G5, which may be concomitant with the step G4, the third item of termination equipment PE3 transmits a second establishment message SIG2 to establish the pseudo-wire pw3 to the first item of termination equipment. This second establishment request SIG2 comprises notably the VPLS identifier of the VPLS domain to which the first and the third items of customer equipment CE1, CE3 belong. The establishment request SIG2 also comprises a label lbl2 intended to be associated as a header of the data frames transmitted by the first item of termination equipment PE1 to the third item of termination equipment PE3 via the pseudo-wire pw3.

Once the pseudo-wire pw3 is established, the first item of termination equipment PE1 deletes from its MAC address table $T_{MAC1}$ the identifier of the item of customer equipment @MAC3 associated with the identifier pw1 of the pseudo-wire pw1 as the logical output interface in order to associate the identifier of the item of customer equipment @MAC3 with the identifier pw3 of the pseudo-wire pw3 during a step G6. Similarly, the third item of termination equipment PE3 deletes from its MAC address table $T_{MAC3}$ the identifier @MAC1 of the item of customer equipment MAC1 associated with the identifier pw1 of the pseudo-wire pw1 as a logical output interface for in future associating the identifier @MAC1 of the item of customer equipment MAC1 with the identifier pw3 of the pseudo-wire pw3 during a step G7. Thus, the data frames D1 transmitted by the item of customer equipment CE1 to the item of customer equipment CE3 are transmitted via the pseudo-wire pw3. The same applies for the data frames D1 transmitted by the item of customer equipment CE3 to the item of customer equipment CE1, which are transmitted via the pseudo-wire pw3.

Specifically, once the MAC tables $T_{MAC1}$ and $T_{MAC3}$ of the items of termination equipment PE1 and PE3 are updated, the first item of termination equipment PE1 no longer transmits a request to transmit data to the second item of termination equipment PE2. Specifically, simply by consulting its MAC address table $T_{MAC1}$ it knows that the data frames D1 transmitted to the item of customer equipment CE3 are intended to be transmitted via the pseudo-wire pw3 and not via the pseudo-wires pw1 and pw2 in turn, as is the case in the existing solutions.

During a step G8, the first item of termination equipment PE1 transmits a message MSG4 to the second item of termination equipment PE2 informing it that the pseudo-wire pw3 is established between the first item of termination equipment PE1 and the third item of termination equipment PE3 for a first direction of transmission. The third item of equipment PE3 also transmits, during the step G9, a message MSG5 informing it that the pseudo-wire pw3 is established between the third item of termination equipment PE3 and the first item of termination equipment PE1 for a second direction of transmission.

In the first embodiment, once the maximum idle time allowed for a pseudo-wire indicated by the parameter ParamATime has elapsed, the first item of termination equipment PE1 transmits to the second item of termination equipment PE2, during a step G10, a notification message MSG6 indicating that the pseudo-wire pw3, established between the first item of termination equipment PE1 and the third item of termination equipment PE3, has been deleted for a first direction of transmission.

During a step G11, the third item of termination equipment PE3 transmits to the second item of termination equipment PE2 a notification message MSG7 indicating that the pseudo-wire pw3, established between the third item of termination equipment PE3 and the first item of termination equipment PE1, has been deleted for a second direction of transmission.

In the second embodiment, the first item of termination equipment PE1 receives, during a step G12, a message MSG8 requesting the deletion of the pseudo-wire pw3 established between the first item of termination equipment PE1 and the third item of termination equipment PE3 for a first direction of transmission. The third item of termination equipment PE3 also receives a message MSG9, identical to the message MSG8 received by the first item of termination equipment PE1, originating from the second item of termination equipment PE2 during G13.

Figure 5:
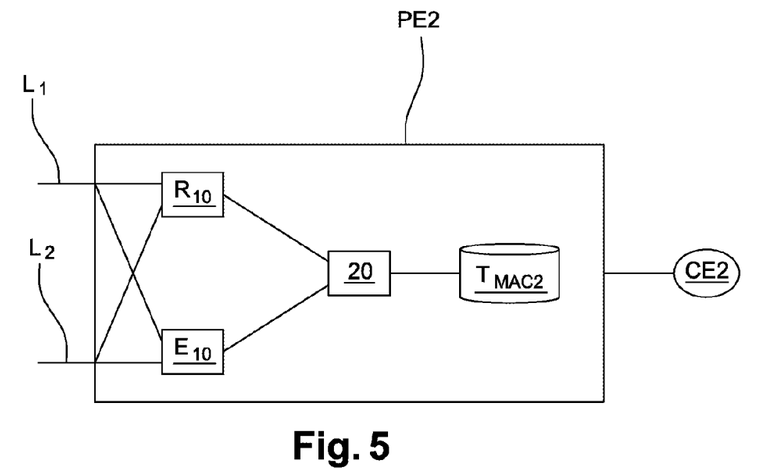
FIG. 5 represents an item of termination equipment intended to fulfill the functions of a master item of termination equipment.

FIG. 5 represents an item of termination equipment intended to fulfill the functions of a master item of termination equipment, such as the second item of termination equipment PE2.

Such an item of termination equipment PE2 comprises receiving means $R_{10}$ connected to the links L1 and L2. Such receiving means are capable of receiving data frames D1, a message MSG4, MSG5 informing the second item of termination equipment PE2 that a pseudo-wire pw3 has been established between the first and the third items of termination equipment PE1 and PE3 or else a message MSG6, MSG7 informing the second item of termination equipment PE2 that the pseudo-wire pw3 established between the first and the third items of termination equipment PE1 and PE3 has been deleted. Finally, the receiving means $R_{10}$ are also capable of receiving data frames transmitted by an item of customer equipment CEi, for example.

The receiving means $R_{10}$ are also connected to interrogation means 20 for interrogating a MAC address table $T_{MAC2}$ comprising the MAC addresses of the various items of termination equipment PE1, PE3 connected to the second item of termination equipment PE2.

The interrogation means 20 are also connected to transmission means $E_{10}$. The transmission means $E_{10}$ are capable of transmitting a data transmission request MSG1, a message MSG2, MSG3 requesting that a pseudo-wire pw3 be established between the first and the third items of termination equipment PE1 and PE3 or else a message MSG8, MSG9 informing the first and the third items of termination equipment PE1, PE3 that the pseudo-wire pw3 established between the first and the third items of termination equipment PE1 and PE3 must be deleted. Finally, the transmission means $E_{10}$ are also capable of transmitting data transmitted by an item of customer equipment CEi, for example. The transmission means $E_{10}$ are connected to the first link L1 and to the second link L2.

Figure 6:
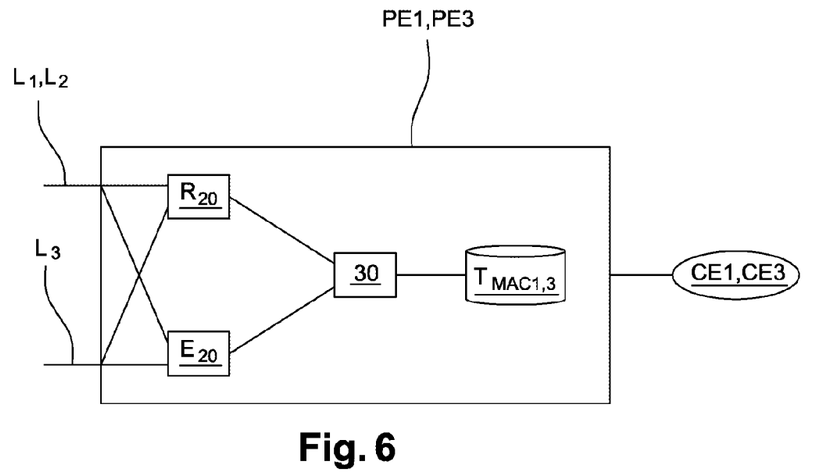
FIG. 6 represents an item of termination equipment intended to fulfill the functions of a slave item of termination equipment.

FIG. 6 represents an item of termination equipment intended to fulfill the functions of a slave item of termination equipment, such as the first and the third items of termination equipment PE1, PE3.

Such an item of termination equipment PE1, PE3 comprises transmission means $E_{20}$ connected to the links L1, L2 and L3, and is capable of transmitting a data transmission request MSG1, a message MSG4, MSG5 informing the second item of termination equipment PE2 that a pseudo-wire pw3 has been established between the first and the third items of termination equipment PE1 and PE3 or else a message MSG6, MSG7 informing the second item of termination equipment PE2 that the pseudo-wire pw3 established between the first and the third items of termination equipment PE1 and PE3 has been deleted. Finally, the transmission means $E_{20}$ are also capable of receiving data transmitted by an item of customer equipment CEi, for example.

The transmission means $E_{20}$ are also connected to interrogation means 30 for interrogating a MAC address table $T_{MAC1}$, $T_{MAC3}$ comprising the MAC addresses of the various items of termination equipment PE2 connected to the first and to the third items of termination equipment PE1, PE3.

The interrogation means 30 are also connected to receiving means $R_{20}$. The receiving means $R_{20}$ are capable of receiving a message MSG2, MSG3 requesting that a pseudo-wire pw3 be established between the first and the third items of termination equipment PE1 and PE3 or else a message MSG8, MSG9 informing the first and the third items of termination equipment PE1, PE3 that the pseudo-wire pw3 established between the first and the third items of termination equipment PE1 and PE3 must be deleted. Finally, the receiving means $R_{20}$ are also capable of receiving data transmitted by an item of customer equipment CEi, for example.

The invention claimed is:

1. A method of communication between a first item of termination equipment and at least one second and one third item of termination equipment belonging to a packet-switching network, a first pseudo-wire being established between the first and the second items of termination equipment, and a second pseudo-wire being established between the first and the third items of termination equipment, the method comprising the following acts carried out by the first item of termination equipment:
   interception of a data frame sent by a first item of customer equipment, connected to the second item of termination equipment, to a second item of customer equipment, connected to the third item of termination equipment, the data frame comprising an identifier of the first item of customer equipment and an identifier of the second item of customer equipment,
   determination of a parameter for identifying the second item of termination equipment to which the first item of customer equipment is connected, based on the identifier of the first item of customer equipment,
   determination of a parameter for identifying the third item of termination equipment to which the second item of customer equipment is connected, based on the identifier of the second item of customer equipment, and
   transmission, to the second item of termination equipment, of a request to establish a third pseudo-wire between the second item of termination equipment and the third item of termination equipment through which the data sent by the first item of customer equipment are intended to be transmitted, wherein the request to establish the third pseudo-wire comprises a parameter representative of the maximum allowed idle time for the third pseudo-wire.

2. The communication method as claimed in claim 1, wherein the request to establish the pseudo-wire comprises a parameter for identifying the second item of termination equipment, the parameter for identifying the third item of termination equipment, a parameter indicating that it involves a request to establish the third pseudo-wire and a parameter for identifying a virtual network to which the first and the second items of customer equipment belong.

3. The communication method as claimed in claim 2, wherein the request to establish the third pseudo-wire also comprises a parameter for identifying the first item of customer equipment and a parameter for identifying the second item of customer equipment.

4. The communication method as claimed in claim 1, comprising receiving a message confirming the establishment of the third pseudo-wire sent by the second item of termination equipment.

5. The communication method as claimed in claim 1, comprising transmitting, to the second item of termination equipment, a request to delete the third pseudo-wire.

6. A method for establishing a pseudo-wire intended to transmit data between a first item of customer equipment and a second item of customer equipment, a first pseudo-wire being established between a first item of termination equipment and a second item of termination equipment to which the first item of customer equipment is connected, a second pseudo-wire being established between the first item of termination equipment and a third item of termination equipment to which the second item of customer equipment is connected, the method comprising the following acts carried out by the second item of termination equipment:
   reception of a request to establish a third pseudo-wire between the second item of termination equipment and the third item of termination equipment, the request to establish comprising a parameter for identifying the second item of termination equipment, a parameter for identifying the third item of termination equipment, a parameter indicating that it involves a request to establish the third pseudo-wire, a parameter for identifying a virtual network to which the first and the second items of customer equipment belong, and a parameter representative of the maximum allowed idle time for the third pseudo-wire, the establishment request being transmitted by the first item of termination equipment, and transmission, to the third item of termination equipment, of a message to establish the third pseudo-wire.

7. The establishment method as claimed in claim 6, comprising transmitting, to the first item of termination equipment, a message confirming the establishment of the pseudo-wire transmitted by the second item of termination equipment.

8. The establishment method as claimed in claim 6, comprising transmitting, to the first item of termination equipment, a message confirming deletion of the pseudo-wire transmitted by the second item of termination equipment.

9. An item of termination equipment capable of communicating with at least one second and one third item of termination equipment belonging to a packet-switching network, a first pseudo-wire being established between said item of termination equipment and the second item of termination equipment, and a second pseudo-wire being established between said item of termination equipment and the third item of termination equipment, the item of termination equipment comprising:

a non-transitory recording medium comprising program code instructions stored thereon; and a computer configured by the program code instructions to perform acts of:

intercepting a data frame sent by a first item of customer equipment, connected to the second item of termination equipment, to a second item of customer equipment, connected to the third item of termination equipment, the data frame comprising an identifier of the first item of customer equipment and an identifier of the second item of customer equipment, determining a parameter for identifying the second item of termination equipment to which the first item of customer equipment is connected, based on the identifier of the first item of customer equipment, determining a parameter for identifying the third item of termination equipment to which the second item of customer equipment is connected, based on the identifier of the second item of customer equipment, and transmitting, to the second item of termination equipment, a request to establish a third pseudo-wire between the second item of termination equipment and the third item of termination equipment through which the data sent by the first item of customer equipment are intended to be transmitted, wherein the request to establish the third pseudo-wire comprises a parameter representative of the maximum allowed idle time for the third pseudo-wire.

10. An item of termination equipment configured to form one end of a first pseudo-wire intended to transmit data between a first item of customer equipment and a second item of customer equipment, the first item of customer equipment being connected to the item of termination equipment, a second pseudo-wire being established between a first item of termination equipment and a second item of termination equipment to which the second item of customer equipment is connected, the first item of termination equipment forming a second end of the first pseudo-wire, the item of termination equipment comprising:

a non-transitory recording medium comprising program code instructions stored thereon; and a computer configured by the program code instructions to perform acts of:

receiving a request to establish a third pseudo-wire between the item of termination equipment and the second item of termination equipment, the request to establish comprising a parameter for identifying the item of termination equipment, a parameter for identifying the second item of termination equipment, a parameter indicating that it involves a request to establish the third pseudo-wire, a parameter for identifying a virtual network to which the first and the second items of customer equipment belong, and a parameter representative of the maximum allowed idle time for the third pseudo-wire, the establishment request being transmitted by the first item of termination equipment, and transmitting, to the second item of termination equipment, a message to establish the third pseudo-wire.

11. A non-transitory recording medium comprising a computer program recorded thereon and comprising program-code instructions for carrying out acts of a method of communication between a first item of termination equipment and at least one second and one third item of termination equipment belonging to a packet-switching network, when the program is executed by a processor, wherein a first pseudo-wire is established between the first and the second items of termination equipment, and a second pseudo-wire is established between the first and the third items of termination equipment, the method comprising the following acts carried out by the first item of termination equipment:

interception of a data frame sent by a first item of customer equipment, connected to the second item of termination equipment, to a second item of customer equipment, connected to the third item of termination equipment, the data frame comprising an identifier of the first item of customer equipment and an identifier of the second item of customer equipment, determination of a parameter for identifying the second item of termination equipment to which the first item of customer equipment is connected, based on the identifier of the first item of customer equipment, determination of a parameter for identifying the third item of termination equipment to which the second item of customer equipment is connected, based on the identifier of the second item of customer equipment, and transmission, to the second item of termination equipment, of a request to establish a third pseudo-wire between the second item of termination equipment and the third item of termination equipment through which the data sent by the first item of customer equipment are intended to be transmitted, wherein the request to establish the third pseudo-wire comprises a parameter representative of the maximum allowed idle time for the third pseudo-wire.

12. A non-transitory recording medium comprising a computer program recorded thereon and comprising program-code instructions for carrying out acts of a method for establishing a pseudo-wire, when the program is executed by a processor, wherein the pseudo-wire is intended to transmit data between a first item of customer equipment and a second item of customer equipment, a first pseudo-wire being established between a first item of termination equipment and a second item of termination equipment to which the first item of customer equipment is connected, a second pseudo-wire being established between the first item of termination equipment and a third item of termination equipment to which the second item of customer equipment is connected, the method comprising the following acts carried out by the second item of termination equipment:

reception of a request to establish a third pseudo-wire between the second item of termination equipment and the third item of termination equipment, the request to establish comprising a parameter for identifying the second item of termination equipment, a parameter for identifying the third item of termination equipment, a parameter indicating that it involves a request to establish the third pseudo-wire, a parameter for identifying a virtual network to which the first and the second items of customer equipment belong, and a parameter representative of the maximum allowed idle time for the third pseudo-wire the establishment request being transmitted by the first item of termination equipment, and transmission, to the third item of termination equipment, of a message to establish the third pseudo-wire.

\* \* \* \* \*